(12) United States Patent
Schmidt et al.

(10) Patent No.: US 8,383,219 B2
(45) Date of Patent: Feb. 26, 2013

(54) MULTILAYER PLASTIC CONTAINER

(75) Inventors: Klaus-Peter Schmidt, Bonn (DE);
Frank Schüller, Frechen (DE);
Reinhard Schubbach, Bergen (DE)

(73) Assignee: Mauser-Werke GmbH, Brühl (DE)

( * ) Notice: Subject to any disclaimer, the term of this patent is extended or adjusted under 35 U.S.C. 154(b) by 0 days.

(21) Appl. No.: 13/411,088

(22) Filed: Mar. 2, 2012

(65) Prior Publication Data

US 2012/0160729 A1 Jun. 28, 2012

Related U.S. Application Data

(63) Continuation of application No. 12/301,147, filed as application No. PCT/EP2007/004382 on May 16, 2007, now abandoned.

(30) Foreign Application Priority Data

May 18, 2006 (DE) ..................... 20 2006 008 091 U

(51) Int. Cl.
*B29D 22/00* (2006.01)

(52) U.S. Cl. ..................... 428/36.7; 428/36.91; 361/212; 361/213

(58) Field of Classification Search ................. 428/36.7, 428/36.91; 206/524.1, 524.2; 361/212, 213
See application file for complete search history.

(56) References Cited

U.S. PATENT DOCUMENTS

| | | | | |
|---|---|---|---|---|
| 4,394,703 A | * | 7/1983 | Butcher | 361/101 |
| 5,124,878 A | * | 6/1992 | Martucci | 361/215 |
| 5,384,172 A | * | 1/1995 | Takado et al. | 428/35.7 |
| 7,042,695 B2 | * | 5/2006 | Przytulla et al. | 361/215 |
| 7,180,721 B2 | | 2/2007 | Schutz | |
| 2003/0106602 A1 | * | 6/2003 | Hsich et al. | 138/137 |
| 2007/0048469 A1 | * | 3/2007 | Schubbach et al. | 428/35.7 |
| 2009/0269530 A1 | * | 10/2009 | Schmidt et al. | 428/36.7 |
| 2012/0160729 A1 | * | 6/2012 | Schmidt et al. | 206/524.9 |

FOREIGN PATENT DOCUMENTS

| | | |
|---|---|---|
| DE | 202 06 435 U1 | 8/2002 |
| DE | 102 42 955 A1 | 3/2004 |
| EP | 1 401 071 A | 3/2004 |
| EP | 1 497 188 B1 | 9/2005 |
| WO | WO 00/47412 A | 8/2000 |
| WO | WO 03/093116 A | 11/2003 |
| WO | WO2005/040269 A | 5/2005 |

OTHER PUBLICATIONS

Technical Report: "Electrostatics—Code of practice for the avoidance of hazards due to static electricity", in: CENELEC, Apr. 19, 2003, p. 10, paragraph 4.4.4.

* cited by examiner

*Primary Examiner* — N. Edwards
(74) *Attorney, Agent, or Firm* — Henry M. Feiereisen LLC

(57) ABSTRACT

A multilayer thermoplastic container for storing and transporting liquid contents, especially combustible or explosive contents, is made of at least three superimposed layers and includes at least one layer for discharging an electric charge. The innermost layer of the container in contact with the liquid content is made of virgin material and a second integrated inner layer which is covered by the innermost virgin material layer is electrically conductive as a result of incorporated additives, e.g. conductive carbon black and is covered on the outside by another electrically non-conductive layer. Electric charge carriers that accumulate on the surface of the thin inner layer due to the friction with the content are "suctioned through" large areas of the inner, electrically non-conductive layer by the second, electrically conductive layer and discharged.

12 Claims, 2 Drawing Sheets

MULTILAYER PLASTIC CONTAINER

CROSS-REFERENCES TO RELATED APPLICATIONS

This application is a continuation of prior filed U.S. application Ser. No. 12/301,147, filed Nov. 17, 2008 which is a continuation of prior filed PCT International application no. PCT/EP2007/004382, filed May 16, 2007, which designated the United States and on which priority is claimed under 35 U.S.C. §120, and which claims the priority of German Patent Application, Serial No. 20 2006 008 091.0, filed May 18, 2006, pursuant to 35 U.S.C. 119(a)-(d).

The contents of U.S. application Ser. No. 12/301,147, PCT International application no. PCT/EP2007/004382, and German Patent Application, Serial No. 20 2006 008 091.0 are incorporated herein by reference in their entireties as if fully set forth herein.

BACKGROUND OF THE INVENTION

The present invention relates to a method for producing electrostatically non-chargeable and/or electrically discharging plastic containers, and a multilayer plastic container produced with this method.

The plastic container can be formed as a jerrican or fassett, as a closed bunged drum, as lidded drum with drum lid and tension ring closure, or as an inner container of a large-volume pallet container.

State-of-the-art:

Systems in commercial use and employed in explosion protection zones or to be filled with flammable contents are, for example, pallet containers with a inner plastic container produced by a multi-layer process with a conductive and/or permanently antistatic outer layer, wherein the content is grounded in the bottom region of the container by employing suitable measures, for example by using metal screws or conductive plastics on the discharge fitting. The corresponding inner plastic containers are predominantly produced by a three-layer or six-layer co-extrusion process and have a total wall thickness of about 2-3 mm. The residual insulating wall thickness remaining after subtraction of the conductive or permanently antistatic outer layer is hereby less than 2 mm.

According to the pertinent technical literature and standards (e.g., CENELEC TR 50404, Page 10) in the technical field relating to electric devices/electronics, a wall thickness of the insulating material of less than 2 mm in conjunction with a permanently connected electrical conductor is viewed as providing adequate safety for preventing charge buildup on the opposite surface of the insulator, which would ignite contents and gases of the explosion groups Group IIA and IIB with an adequate discharge.

The self-supporting plastic containers, for example drums or jerricans, designed for use in explosion protection zones or for filling with flammable contents, are predominantly produced by a multilayer process and use a conductive and/or permanently antistatic plastic material in the outer layer. If necessary, the contents are electrically grounded by way of additionally inserted grounding elements made of conductive materials, for example by a pump pipe inserted into the container and made of electrically conductive plastic, which is electrically connected with the conductive outer layer of the container (EP 1 497 188 A).

A dischargeable plastic container is known which has a strip, similar to a viewing strip, made of conductive plastic material and introduced in the container wall (DE 102 42 955). The strip is permanently connected with the conductive outer layer and has a thickness equal to the overall thickness of the three-layer container wall. Disadvantageously, the entire container wall is completely severed in the longitudinal direction at one or several locations, because the connection of the electrically conductive plastic strip with the plastic material of the multilayer container wall always represents a critical contiguous weak spot when the filled container is subjected to greater mechanical stress.

If the total wall thickness of a container has to be increased significantly above 2 mm to provide overall stability of the container (the average wall thickness of a 8.5 kg bunged drum in the surface region is approximately 3-3.5 mm), then the need for the insulating (inner) layers to be in direct contact with the conductive outer layer with a remaining residual thickness of maximally 2.5 mm can be attained only with a correspondingly thick outer layer made of conductive material. This has significant disadvantages both due to economic and mechanical reasons, because suitable conductive plastic materials (e.g., by addition of carbon black) are relatively expensive and have significantly inferior material properties, for example with respect to their stability at low temperatures.

SUMMARY OF THE INVENTION

It is an object of the present invention to improve a multilayer plastic container for use in explosion protection zones and to be filled with flammable liquids of the explosion group IIA and IIB, such that the container retains its superior electrostatic characteristics and improved mechanical stability, while remaining cost-effective, even with increased wall thickness, i.e., a wall thickness exceeding 2 mm.

The container according to the invention is produced as a multilayer container preferably with an extrusion blow molding process and is characterized by at least one (inner, embedded) layer made of an electrically conductive plastic material and integrated in the wall of the container body, wherein the layer divides the remaining residual wall into at least two insulating plastic layers, each having a layer thickness of less than 2.5 mm. The plastic material used for these layers is a HDPE plastic (high-density polyethylene).

It has been observed that the inner surface of the HDPE plastic layer in contact with the content is electrostatically charged either not at all or only slightly, if this inner, insulating and non-conductive plastic layer has a layer thickness of less than 2.5 mm or 2 mm, respectively. By arranging over a large area a plastic layer with good electric conductivity behind the insulating layer on the inside of the container, the generated electric charges are transported through the inherently insulating plastic layer along the shortest path (less than or equal to 2.5 mm) and are "suctioned off" by the underlying electrically conductive layer. After the electrically conductive plastic layer has absorbed sufficient electric charge and has attained a sufficiently high charge carrier concentration, these charge carriers are radially discharged to ground through the outer insulating plastic layer having a layer thickness of less than 2.5 mm or 2 mm, respectively, and across an electrically conductive support surface of the plastic container.

With the container wall according to the invention, due to the large area contact surface of the two layers in the radial direction, the negatively charged electrons/charge carriers, which electrically charge the inner surface of the plastic container, are drawn through the layer which is made of HDPE virgin material in the radial direction across a very short distance (less than/equal to 2.5 mm) and received by the electric conductor, where they accumulate. The charge gradient from the inside (high) to the outside (low) causes radially outward migration of the charge carriers through the "insulating layer". The electric conductivity of the electrically conductive plastic layer is adjusted through addition of carbon black compounds. Because carbon black is very expensive, the electrically conductive plastic layer is generally made very thin (less than/equal to 5% of the total wall thickness).

If the plastic container according to the invention is to be used for sensitive and expensive chemicals, the innermost layer in contact with the liquid content may advantageously be made of HDPE virgin material, and the second integrated HDPE layer which is covered by the innermost virgin material layer is rendered electrically conductive by suitable additives (e.g., carbon black), wherein the outside of the electrically conductive layer is covered by at least one additional electrically non-conductive or insulating HDPE layer. When used with high-purity, highly sensitive liquids for the electronic industry, the material layer in contact with the content can consist of a particularly pure plastic raw material which is completely free of contamination, such as catalysts and stabilizers or harmful metal ions, thereby satisfying the high cleanliness requirements for the particular content. In particular, catalyst residues, fillers, stabilizers, antioxidants, softeners/plasticizers or process aids, such as stearates etc, are regarded as contaminants of the high-purity plastic material.

According to another embodiment of the invention, the additional, electrically non-conductive or insulating HDPE layer is interrupted by a narrow, vertically extending plastic strip made of an electrically conductive plastic material—similar to a viewing strip—, which—when viewed in the radial direction—has only the thickness of the additional, electrically non-conductive or insulating HDPE layer and has a positive and electrically conductive connection with the integrated, electrically conductive HDPE layer. The plastic container has here an additional continuous, i.e., unbroken, inner layer made of HDPE virgin material which can optionally be made very thin with a wall thickness of only 0.5-1 mm, allowing the electric charges to be readily "suctioned through" and absorbed by the "inner" integrated electrically conductive plastic layer. This integrated electrically conductive plastic layer has a good electrically conductive connection with the electrically discharging standing area of the plastic container by way of the narrow, vertically extending contact strip made of an electrically conductive plastic material, which is inserted in the outer, electrically non-conductive or insulating HDPE layer by a process similar to a conventional viewing strip and which extends in the bottom area of the container up to the parting line.

According to another embodiment, the electric discharge function of the container can be improved with a four-layer wall construction, wherein the fourth plastic layer externally covers the existing three layers and is also made of electrically conductive HDPE plastic material. In this way, electric charges collected in the integrated (embedded) electrically conductive plastic layer are also suctioned over a large area through the third layer, which does not consist of an electrically conductive plastic material, and discharged to ground via the outer electrically conductive layer of the plastic container and its support surface. In addition, the third layer which is not made of a conductive plastic material, may also be interrupted by a narrow vertically extending contact trip made of an electrically conductive plastic material—similar to a viewing strip—, which—when viewed in the radial direction—has only the thickness of the electrically non-conductive or insulating HDPE layer, thus functioning as a conductive bridge which directly connects the integrated inner plastic layer made of electrically conductive plastic material electrically with the fourth outer layer made of electrically conductive plastic material.

According to another embodiment of the invention, discharge of the accumulated charge carriers from the integrated inner electrically conductive plastic layer can be promoted and accelerated by introducing at least one narrow vertically extending plastic strip made of an electrically conductive plastic material in the outer, electrically conductive plastic layer and the following, electrically non-conductive or insulating HDPE layer, wherein the strip—when viewed in the radial direction—has only the thickness of the two layers and has a positive and electrically conductive connection with the inner integrated, electrically conductive HDPE layer.

The one-part (single piece) plastic container produced by an extrusion blow molding process is implemented with at least three layers, for particular applications also with four or seven layers, and has the following layer construction:

3-layer (layers numbered in ascending order from the inside to the outside):

| Layer | Layer thickness | Layer material |
| --- | --- | --- |
| 1 inside | <2.5 mm | Insulating plastic (HDPE virgin material) |
| 2 | <5% of the total wall thickness | Electrically conductive plastic |
| 3 outside | <2.5 mm | Insulating plastic (HDPE) |

4-layer (layers numbered in ascending order from the inside to the outside):

| Layer | Layer thickness | Layer material |
| --- | --- | --- |
| 1 inside | <2.5 mm (up to ca. 45%) | Insulating plastic (HDPE virgin material) |
| 2 | <5% of the total wall thickness | Electrically conductive plastic |
| 3 | <2.5 mm (up to ca. 45%) | Reclaimed process material + insulating plastic (HDPE) |
| 4 outside | <5% of the total wall thickness | Insulating plastic (HDPE) |

7-layer (layers numbered in ascending order from the inside to the outside):

| Layer | Layer thickness | Layer material |
| --- | --- | --- |
| 1 inside | <2.5 mm (up to ca. 45%) | Insulating plastic (HDPE virgin material) |
| 2 | <5% of the total wall thickness | Electrically conductive plastic |
| 3 | <2.5 mm (up to ca. 45%) of the total wall thickness | Insulating bonding agent (admer) ca. 3% |
| 4 | | Insulating barrier plastic (polyamide PA or EVOH) ca. 3% |
| 5 | | Insulating bonding agent (admer) ca. 3% |
| 6 | | Reclaimed process material + insulating plastic (HDPE) |
| 7 outside | <5% of the total wall thickness | Insulating plastic (HDPE) + dye |

The sensitive content then advantageously does not come into contact with the electrically conductive plastic layer (containing carbon black).

With the corresponding layer construction, the maximum layer thickness of the insulating plastic layers in the entire wall is thereby less than 2.5 mm, thus preventing critical electric charge buildup of exposed insulating surfaces. A lesser quantity of expensive conductive plastic materials is used due to the very thin construction of the corresponding layers. These very thin layers of conductive plastic material are also substantially more flexible than a single brittle plastic layer with carbon black applied to the outside of a corresponding container, thereby significantly improving the low-temperature stability. It should be noted that the addition of carbon black—as is generally known—can significantly degrade the mechanical properties of electrically conductive plastics.

For grounding the potential content inside the container through a direct electric connection from the inner surface to the outer surface, the container of the invention in the embodiment with electrically conductive plastic layers can also be constructed such that the insulating plastic layers are partially interrupted or bridged by conductive plastic material, thereby connecting the conductive layers inside the container wall with one another.

An essential feature of this local layer disruption is that the partial disruption of one layer does not lead to a disruption in the radial direction of other layers or all layers, so that no continuous conductive connection throughout the entire wall thickness is established. With this advantageous embodiment, mechanically weak areas in form of contiguous material accumulations (in the radial direction as well as in the axial direction) of the brittle conductive plastic which occurs with similar conventional solutions (DE 102 42 955 Sch.) are eliminated, which significantly improves the shock resistance of containers constructed in this way.

The conductive strips which are arranged over a limited local area within the non-conductive insulating plastic layers of the container wall extend preferably parallel to the longitudinal container axis in the vertical direction across the container body and radially across the bottom/top surface of the container. However, the conductive contact strips may also have other forms, for example, a point-shape or a spiral-shape.

At least one local conductive connecting point is provided for each insulating layer. Additional locally conductive connecting strips for each layer can be easily implemented and applied depending on the manufacturing process.

The position of the local conductive connecting strips—as viewed in the circumferential direction—in the individual insulating layers can be freely selected for different embodiments having mutual offsets.

In an embodiment preferred for implementing the process, the strips are advantageously positioned in the container wall parallel to the container axis, or vertical, with an offset of about 10° from the mold parting line. In the corresponding arrangement, the two local conductive strips are arranged in the various layers with a mutual offset of 180°.

BRIEF DESCRIPTION OF THE DRAWING

Schematically illustrated exemplary embodiments of the invention will now be explained and described in greater detail with reference to the drawings.

DETAILED DESCRIPTION OF PREFERRED EMBODIMENTS

The plastic container of the invention can be formed, for example, as a jerrican or fassett, as a bunged drum, as a lidded drum with drum lid and tension ring closure, or as an inner container of a large-volume pallet container. A plastic container of this type has generally vertical container walls with a horizontal container top and bottom, wherein closable gas- and liquid-tight fill and drain openings are arranged at least in the container top or in the container lid, respectively.

Figure 1:
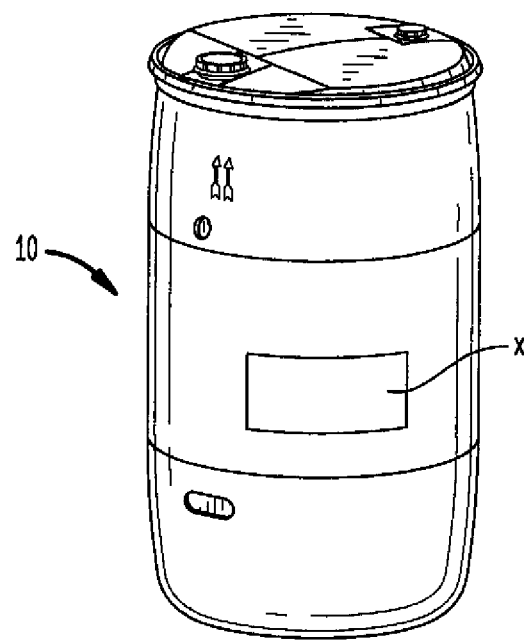
FIG. 1 shows a plastic container of the invention constructed as a to 20 liter L-ring drum.

FIG. 1 shows an embodiment of a 22 liter bunged drum, having the reference numeral 10. The average wall thickness of this bunged drum with a standard weight of 8.5 kg is approximately 3 mm to 3.5 mm in the wall region. In a heavier embodiment (US version) of a 22 liter bunged drum (55 US gallons) weighing in excess of 10 kg, the average total wall thickness is about 3.5 mm to 4.5 mm. A rectangular wall segment in the vertical container wall of the drum 10 is indicated with "X". Different embodiments of the wall construction of this wall segment will be more explained and described in more detail in the following figures. The virgin material used for the inner and/or outer layer or for mixing with reclaimed material (scrap material and/or mill material) is preferably high density polyethylene (HD-PE, e.g., Lupolen 5021 D) or high-molecular polyethylene (HM-PE, e.g., Lupolen 5261 Z).

Figure 2:
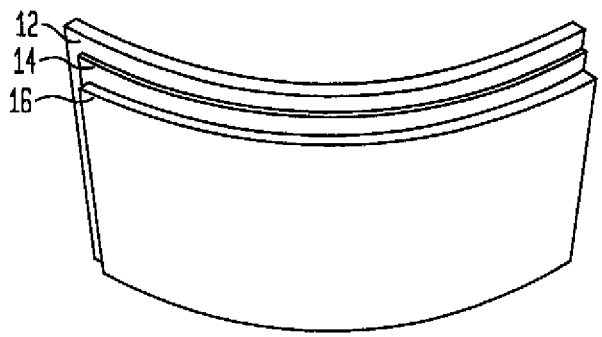
FIG. 2 shows a 3-layer construction of the invention with conductive center layer.

In a first exemplary embodiment, the rectangular wall section "X" having a three-layer wall construction is shown in FIG. 2, wherein the inner layer 12 in contact with the content is made of virgin HDPE material, the intermediate thin layer 14 is made of an electrically conductive HD-PE plastic by addition of carbon black, and the outer layer 16 is once more made of virgin HD-PE material, optionally with intermixed, for example blue, color pigments.

Figure 3:
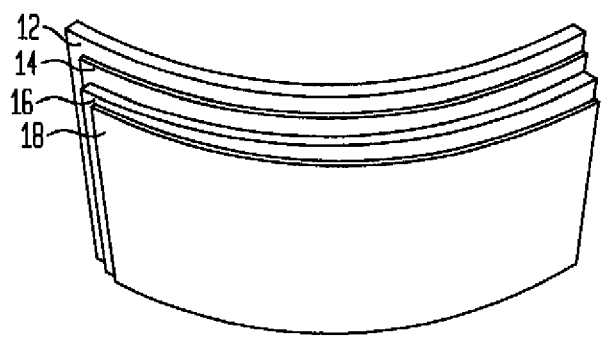
FIG. 3 shows a 4-layer construction of the invention with conductive center layer.

FIG. 3 shows a particularly preferred embodiment having a four-layer wall construction according to the invention with a thin conductive inner layer. The inner layer 12 contacting the content is once more made of insulating plastic (HD-PE virgin material) having a layer thickness of, in this case, approximately 0.5 mm (which can reach about 45% of the total wall thickness), the following integrated thin layer 14 is made of electrically conductive HD-PE plastic with a layer thickness of less than 5% of the total wall thickness, the third layer 16, which is now also an interior layer, is made of reclaimed process material and insulating plastic (HD-PE virgin material) with a layer thickness of about 1.5 mm or up to 45% of the total wall thickness, and the outer fourth layer 18 (on the outside of the plastic container) is made again of electrically conductive plastic (HD-PE with carbon black) with a small layer thickness of less than 5% of the total wall thickness.

Figure 4:
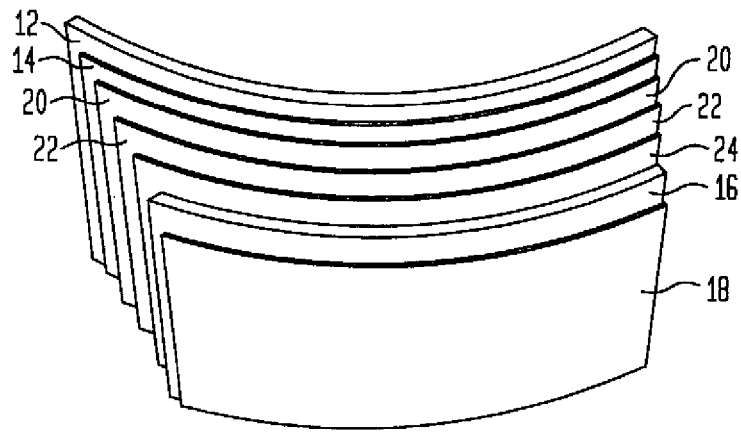
FIG. 4 shows a 7-layer construction of the invention with conductive center layer.

Another exemplary embodiment is illustrated in FIG. 4. The wall construction (according to FIG. 3) for attaining optimal barrier properties to prevent leakage of volatile components (e.g., hydrocarbons, carbon dioxide, aromatic materials and the like) from the content is augmented up by three additional layers 20, 22 and 24, which are arranged between the comparatively thin electrically conductive layer 14 and the comparatively thick layer 16. The layer 22 is made of an isolating barrier plastic (polyamide PA or EVOH), and the two adjacent layers 20 and 24 are made of an insulating bonding agent (admer) for forming a material connection between the different plastic materials (HD-PE and polyamide PA or EVOH), which without a bonding agent would not adhere to one another merely through direct contact. The layer thickness of each of these three thin layers 20, 22 and 24 is only 3% of the total wall thickness. The EVOH layer (ethyl vinyl alcohol) is a conventional barrier layer commonly used as a gas- and oxygen-barrier material.

Figure 5:
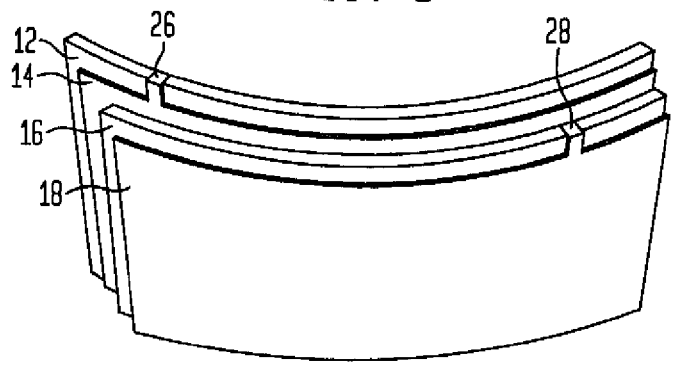
FIG. 5 shows a 4-layer construction of the invention with conductive center layer and local conductive strips in the insulating layers.

The exemplary embodiment depicted in FIG. 5 has again a four-layer wall construction as in FIG. 3; however, at least two strips 26 and 28 made of an electrically conductive plastic and extending in the longitudinal container direction, or vertically, are inserted in the insulating plastic layers 12 and 16. For example, two of each of these strips may be incorporated.

The strips can have a width (in the circumferential direction) of about 10 mm to 50 mm. These strips 26 and 28 provide, on one hand, an electrically conductive bridge connection between the liquid content and the inner electrically conductive thin layer 14 and, on the other hand, an electrically conductive bridge connection between the inner electrically conductive thin layer 14 and the electrically conductive thin layer or outer layer 18. These two strips 26 and 28 which provide a connection to ground are introduced into the tubular preform in a conventional manner of a viewing strip. The pre-form is extruded from an annular nozzle of a circumferential manifold or an extrusion accumulator head and expanded with compressed air in a blow mold to the shape of the finished container.

Unlike a conventional continuous, electrically conductive connecting strip which extends through the entire wall like a viewing strip—as viewed in the radial direction—, each of the two strips 26, 28 extends in the wall of the respective container in the radial direction only partially, i.e., not all the way through. In addition, the two strips 26 and 28 are laterally spaced apart and arranged with a mutual offset at different positions along the periphery of the plastic container.

Figure 6:
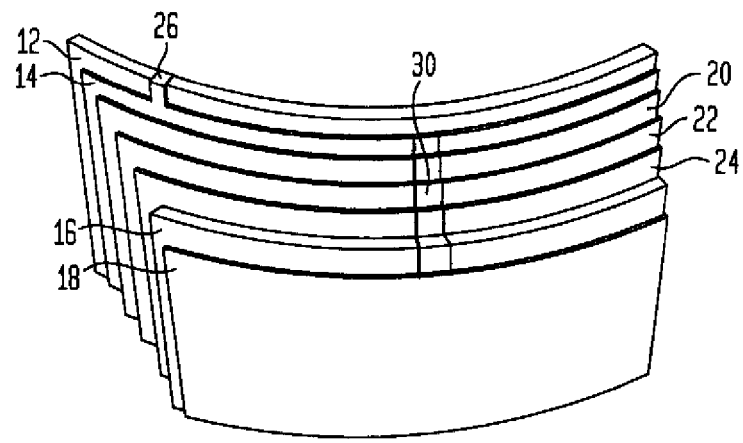
FIG. 6 shows a 7-layer construction of the invention with conductive center layer and local conductive strips in the insulating layers.

As depicted in FIG. 6, this modified embodiment with at least two vertically extending contact strips having a mutual offset in the circumferential direction may also be implemented in a plastic container having a seven-layer wall construction. The electrically conductive plastic strip 26 extends only inside the thick, electrically non-conductive plastic layer 12 and provides an electrical connection between the content and the inner conductive thin layer 14, whereas the strip 30 extends radially across the layers 20, 22, 24 and 16, forming an electric bridge between the integrated electrically conductive thin layer 14 and the electrically conductive thin outer layer 18.

The inner integrated electrically conductive HDPE layer is in electrically conductive contact with the content inside the container via at least one contact strip made of electrically conductive plastic material and introduced in the inner layer made of insulating plastic (HDPE virgin material) which contacts the content, and is in addition in electrically conductive contact with the outer electrically conductive plastic layer via at least one additional contact strip made of non-conductive plastic material (without the addition of carbon black) and introduced in the remaining layers which cover the inner integrated electrically conductive HDPE layer from the outside.

If necessary, an electrical connection can hence be formed between the inner surface and the outer surface of the container, in combination with local sections made of conductive plastic material that are also integrated in the remaining insulating residual layers. The thickness of the individual local connection—as viewed in the radial direction—is here smaller than the total wall thickness of the container.

The use of continuous strips made of electrically conductive plastic material advantageously significantly reduces the otherwise unpreventable deterioration of the low-temperature stability.

In a process according to the present invention, three different plastic materials are supplied from at least three extruders to a circumferential manifold and reshaped into a tubular preform having at least three layers, wherein the inner layer is made of an electrically non-conductive plastic material (HDPE virgin material), the integrated layer covered by the inner layer is made of an electrically conductive plastic material (e.g., HDPE with addition of carbon black), and an additional outer layer which is also made of an electrically non-conductive plastic material (HDPE), and wherein this tubular preform is expanded in a corresponding blow mold with compressed air to a hollow plastic body. The circumferential manifold is additionally provided with appropriate means for introducing the contact strips made of electrically conductive plastic material at a desired location in the interior and/or exterior layers, which are made of an electrically nonconductive plastic material.

What is claimed is:

1. A multilayer thermoplastic container for storing and transporting a liquid bulk material, comprising:
   at least two insulating high-density polyethylene (HDPE) plastic layers forming an inner layer made of HDPE virgin material and an outer electrically non-conductive or insulating HDPE layer, each of the at least two layers having a thickness of less than 2.5 mm, and
   an intermediate layer made of HDPE plastic material comprising an additive which renders the intermediate layer electrically conductive, said intermediate layer disposed at least in a wall of the container intermediate between the inner layer and the outer layer,
   wherein the inner layer is interrupted by a first narrow, vertically extending plastic strip made of an electrically conductive plastic material which has a radial thickness substantially identical to a radial thickness of the inner layer, and wherein the outer layer is interrupted by a second narrow, vertically extending plastic strip made of an electrically conductive plastic material which has a radial thickness substantially identical to a radial thickness of the outer layer, with both the first and second narrow, vertically extending plastic strip being electrically connected with the intermediate layer.

2. The plastic container of claim 1, wherein the additive is conductive carbon black.

3. The plastic container of claim 1, further comprising a fourth layer made of electrically conductive HDPE plastic material and externally covering the outer layer.

4. The plastic container of claim 3, wherein the inner layer and the outer layer each have a radial thickness that does not to exceed about 45% of a total container wall thickness, and the intermediate layer and the fourth layer each have a radial wall thickness of no more than 5% of the total container wall thickness.

5. The plastic container of claim 3, further comprising at least one narrow, vertically extending plastic strip made of electrically conductive plastic material and introduced in the fourth layer and the outer layer, wherein the strip has a radial thickness substantially identical to a radial thickness of the combined fourth and outer layer, and is electrically connected with the intermediate layer.

6. The plastic container of claim 1, further comprising at least one narrow, vertically extending plastic strip made of electrically conductive plastic material and introduced in the inner layer, wherein the strip has a radial thickness substantially identical to a radial thickness of the inner layer and is electrically connected with the intermediate layer.

7. The plastic container of claim 1, further comprising a barrier layer construction made of a polyamide PA or ethyl vinyl alcohol (EVOH) layer sandwiched between two layers having a bonding agent, wherein the barrier layer construction is arranged between the intermediate layer and the outer layer.

8. The plastic container of claim 1, wherein the outer layer is made of virgin material or regrind material, or both.

9. The plastic container of claim 7, further comprising
at least one first contact strip made of electrically conductive plastic material and introduced in the inner layer for providing electric contact between the intermediate layer and the bulk material in the container, and
at least one additional contact strip made of electrically conductive plastic material that does not contain carbon black, wherein the at least one additional contact strip is introduced in the barrier layer construction for providing electric contact between intermediate layer and the outer layer.

10. The plastic container of claim 1, wherein the content comprises flammable or explosive content.

11. A method for producing a multilayer plastic container, comprising the steps of:

supplying three different plastic materials from at least three extruders to a peripheral distributor, forming an at least three-layer tubular preform having an inner layer made of HDPE virgin material, an outer electrically non-conductive or insulating HDPE layer and an intermediate layer disposed between the inner layer and the outer layer, wherein the inner layer and the outer layer are made of an electrically non-conductive plastic material, and the intermediate layer is made of HDPE plastic material comprising an additive which renders the intermediate layer electrically conductive, wherein the inner layer is interrupted by a first narrow, vertically extending plastic strip made of an electrically conductive plastic material which has a radial thickness substantially identical to a radial thickness of the inner layer, and wherein the outer layer is interrupted by a second narrow, vertically extending plastic strip made of an electrically conductive plastic material which has a radial thickness substantially identical to a radial thickness of the outer layer, with both the first and second narrow, vertically extending plastic strip being electrically connected with the intermediate layer, and expanding the tubular preform in a blow mold into a hollow plastic body.

12. The method of claim 11, wherein the intermediate layer comprises carbon black as an additive.

* * * * *